United States Patent [19]

Adawi et al.

[11] 4,024,706
[45] May 24, 1977

[54] METHOD OF IMPROVING THE OPERATIONAL CAPACITY OF THREE-WAY CATALYSTS

[75] Inventors: Marwan K. Adawi, Westland; Allan D. Briggs, Melvindale; Robert G. DeLosh, Ann Arbor; Carol S. Smith, Detroit, all of Mich.

[73] Assignee: Ford Motor Company, Dearborn, Mich.

[22] Filed: Jan. 7, 1976

[21] Appl. No.: 645,006

[52] U.S. Cl. .................................. 60/274; 60/299
[51] Int. Cl.$^2$ ..................... F02B 75/10; F01N 3/15
[58] Field of Search ............ 60/274, 276, 285, 282, 60/299; 123/119 R, 32 EA, 119 EC

[56] References Cited
UNITED STATES PATENTS

| | | | |
|---|---|---|---|
| 3,287,899 | 11/1966 | Bintz | 60/299 |
| 3,782,347 | 1/1974 | Schmidt | 60/276 |
| 3,809,743 | 5/1974 | Unland | 60/301 |
| 3,861,366 | 1/1975 | Masaki | 123/119 EC |

*Primary Examiner*—Douglas Hart
*Attorney, Agent, or Firm*—William E. Johnson; Keith L. Zerschling

[57] ABSTRACT

A method is disclosed for widening the range of air-fuel ratios over which three-way catalysts having an oxygen storage capacity are operative. Three-way catalysts are operative when new both in oxidizing at least 80% of the unburned hydrocarbons and carbon monoxide and in reducing 80% of the oxides of nitrogen contained in an exhaust gas stream delivered to the catalysts from an engine. In general, the method is conducted by supplying to the engine to be burned therein an air-fuel mixture in which the fuel to air ratio is varied from a rich condition in which more fuel is present than air to burn it to a lean condition in which less fuel is present than air to burn it. The air-fuel ratio is displaced equal amounts to the rich and to the lean sides from a stoichiometric condition. The displacement to each side is generally of an identical nature and the overall frequency of displacement is such that the oxygen storage capacity of the particular three-way catalyst is not exhausted during the lean portion of the cycle.

6 Claims, 3 Drawing Figures

METHOD OF IMPROVING THE OPERATIONAL CAPACITY OF THREE-WAY CATALYSTS

BACKGROUND OF THE INVENTION

So-called three-way catalysts have been proposed in the art for treating exhaust gases from internal combustion engines. An engine using such a catalyst generally operates at a stoichiometric air-fuel ratio to be effective in the simultaneous control of oxides of nitrogen, carbon monoxide and unburned hydrocarbons.

The engine operating with such catalysts requires a precise metering of fuel and air thereto. For example, electronic fuel monitoring, fuel injection or improved venturi carburetors can be used for precise fuel metering. An air-fuel ratio sensor coupled with a feedback control system is used to correct the air-fuel ratio when that ratio drifts away from the set value required therefor.

In using such three-way catalysts, it has generally been taught that the air-fuel mixture supplied to the engine be one in which stoichiometric amounts of air and fuel are used. In general, a stoichiometric air-fuel ratio is about 14.7 although the exact ratio depends on the type of fuel being used. The prior art has taught that in using three-way catalysts there should be just sufficient oxygen present in the air-fuel mixture to burn all of the fuel to the final combustion products of carbon dioxide and water. However, in the actual burning of the air-fuel mixture some of the nitrogen present in the air is transformed into oxides of nitrogen, some of the hydrocarbons are not fully burned and some carbon monoxide is formed. Thus, in the use of a three-way catalysts, the unwanted products of combustion passing thereover are rearranged in order to achieve a proper burning of all of the fuel to its final composition products and an elimination of all oxides of nitrogen.

The prior art also has taught that three-way catalysts have a relatively small air-fuel ratio window over which the fresh catalyst is effective in both oxidizing at least 80% of the unburned hydrocarbons and carbon monoxide and reducing 80% of the oxides of nitrogen. By air-fuel ratio window we mean the number of units of air-fuel ratio over which both the 80% oxidation and the 80% reduction is achieved. Generally under both lean and rich air-fuel ratios the reduction of oxides of nitrogen falls off below the 80% level whereas under rich air-fuel conditions the oxidation of at least 80% of the unburned hydrocarbons and carbon monoxide is difficult to achieve.

The operative air-fuel ratio window for most three-way catalysts to achieve the 80% efficiency is relatively small. For example, the air-fuel ratio window for catalysts known to us is in the range of 0.02 to 0.08 units of air-fuel ratio. This means that the system controlling the air-fuel ratio o the mixture being fed to the engine must be fairly sophisticated. The system must be one which rapidly corrects any drift of the air-fuel ratio beyond the operative air-fuel ratio window.

It is a principal object of this invention to provide a method for widening the air-fuel ratio window, i.e., the range of air-fuel ratios, over which three-way catalysts are operative.

It is still another object of this invention to provide a method for widening the air-fuel ratio window over which three-way catalysts are operative which is simple and efficient in operation.

SUMMARY OF THE INVENTION

This invention is directed to a method for widening the range of air-fuel ratios over which three-way catalysts are operative and, more particularly to a method for widening the range of air-fuel ratios over which three-way catalyts having an oxygen storage capacity are operative both in oxidizing at least 80% of unburned hydrocarbons and carbon monoxide, and in reducing 80% of oxides of nitrogen contained in an exhaust gas stream delivered to the three-way catalyst from an engine.

In accordance with the teachings of the method of this invention, an engine is supplied with an air-fuel mixture to be burned. The air-fuel mixture is one in which the fuel to air ratio is varied from a rich condition in which more fuel is present than air to burn it to a lean condition in which less fuel is present than air to burn it. The air-fuel ratio is displaced in equal amounts to the rich and to the lead sides from a stoichiometric condition. The cycle of displacement to the rich and to the lead sides is generally identical and of a frequency that insures that the oxygen storage capacity of the three-way catalyst is not exhausted during the lead portion of the cycle.

A specific application of the method of this invention teaches that the frequency of the air-fuel ratio be in most cases at least about 1 cycle per second. Also in accordance with a further specific application of the method of this invention, the variance of the air-fuel ratio about a stoichiometric condition is generally about one unit of air-fuel ratio to the rich and to the lean sides from the stoichiometric condition.

DESCRIPTION OF THE PREFERRED EMBODIMENT

A three-way catalyst is one which simultaneously oxidizes unburned hydrocarbon (HC) and carbon monoxide (CO) and reduces oxides of nitrogen ($NO_x$) found in an exhaust gas stream from an internal combustion engine. Such three-way catalysts are known in the art. Also known in the art are three-way catalysts which have an oxygen storage capacity. By an oxygen storge capacity we mean that during times of a momentary fuel lean condition occuring after a rich condition, that is when more oxygen is available than fuel to be burned, the catalysts are capable of storing such excess oxygen temporarily so that it is not available for oxidizing preferentially HC and CO. A three-way catalyst having such an oxygen storage potential is disclosed in U.S. patent application Ser. No. 607,660 filed Aug. 25, 1975 and entitled: "Method of Momentarily Extending the Operative Range of an Equilibrium Type Catalyst." This application is assigned to the same assignee as this application and is hereby incorporated by reference. Many catalyst companies have available on the market three-way catalysts with an oxygen storage capacity.

Three-way catalysts are used with an internal combustion engine operated on a stoichiometric air-fuel mixture. In order to achieve the operation of an engine on such a closely controlled air-fuel ratio, it is necessary to have an engine control system which monitors the exhaust gases issuing from the engine to determine their general composition and thereafter control the quantity of fuel being added to the air passing into the engine to be burned. A complete system for controlling the air-fuel ratio of a mixture being fed to an engine to be burned is disclosed in a Society of Automotive Engineers Incorporated Paper No. 750368. This paper is entitled *Bosch Electronic Fuel Injection with Closed Loop Control* and is authored by I. Gorille et al. and is available through the SAE at 2 Pennsylvania Plaza, New York, New York 10001. In general, the system disclosed in the paper is one which uses a three-way catalyst for treatment of the exhaust gases issuing from the engine. This system controls the air-fuel ratio of the mixture to be burned by the engine to one in which a stoichiometric quantity of air is available to oxidize the hydrocarbons being burnt.

Figure 1:
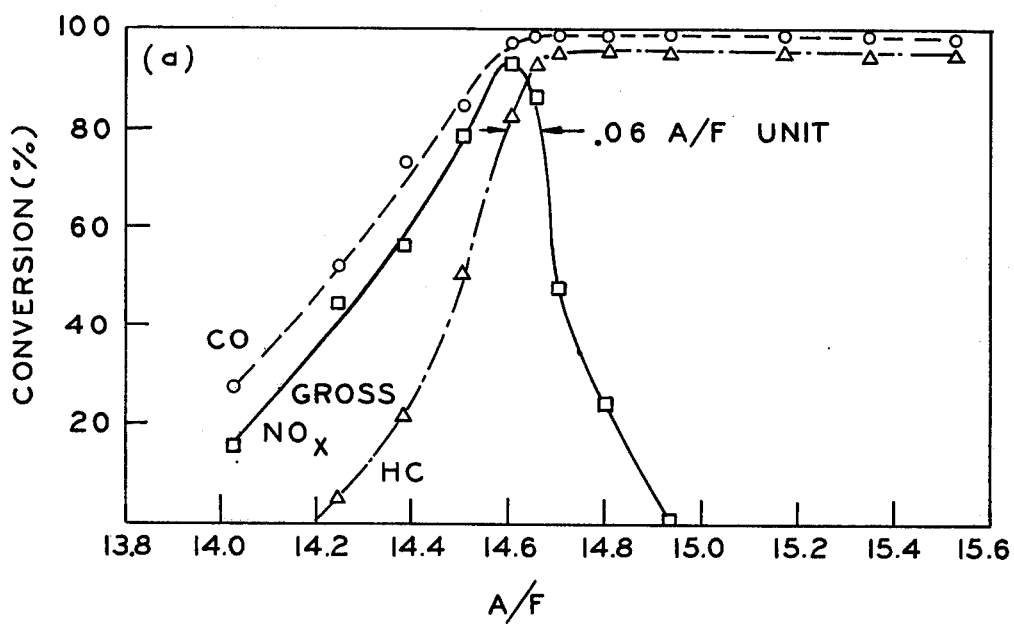
FIG. 1 is a graphical presentation of the present conversion of carbon monoxide, unburned hydrocarbons and oxides of nitrogen upon a three-way catalyst when compared with various air-fuel ratios being supplied for burning in an engine associated with the catalysts.

Reference is now made to FIG. 1 which graphically shows the results of tests carried out on a system wherein a three-way catalyst is provided for treating the exhaust gases from an engine. The air-fuel ratio of the mixture burned in the engine was controlled to each preset ratio tested by the use of the control system described in the SAE paper with the engine operated in an open loop mode. From FIG. 1 it is apparent that the conversion of CO, HC and $NO_x$ decreases as one moves towards the rich side from the stoichiometric air-fuel ratio of about 14.7. As one approaches the equilibrium the percent of the HC, CO and $NO_x$ converted in passing over the catalysts increases. As one passes to a lean air-fuel mixture side of stoichiometric in which excess oxygen is available, the conversion of CO and HC becomes almost total but as one passes beyond the stoichiometric air-fuel ratio to the lean side the conversion of $NO_x$ falls off.

As is apparent from FIG. 1, the so-called window of air-fuel ratios at which at least 80% of the CO, HC and $NO_x$ are converted has a size of 0.06 air-fuel units. In other words, if one was controlling the air-fuel ratios being fed to the engine, one would desire to stay within this window of air-fuel ratios in order to achieve at least 80% conversion of all of the three materials on fresh catalysts. The control system on the vehicle to accomplish a control of the air-fuel ratios within the window for all vehicle operations will have to be very fast acting and highly sensitive in order to accomplish such a fine control.

Our invention is directed to a process for widening the window of air-fuel ratios over which an engine may be operated and still produce an exhaust gas composition which may be handled by a three-way catalyst. Although the window of air-fuel ratios is widened, the three-way catalysts are still effective in converting more than 80% of the HC, CO and $NO_x$. We have found that if instead of controlling the air-fuel ratio exactly at stoichiometric, the controller is set so that it controls the air-fuel ratio in a regular manner both to the rich and to the lean sides of stoichiometric in a continuous manner the air-fuel window is enlarged. For example, instead of controlling exactly along a stoichiometric air-fuel ratio of 14.7, the air-fuel ratio is controlled in a prescribed manner from 13.7 to 15.7 and is cycled back and forth by the air-fuel ratio controller controlled by an external signal acting in an open loop mode.

Figure 2:
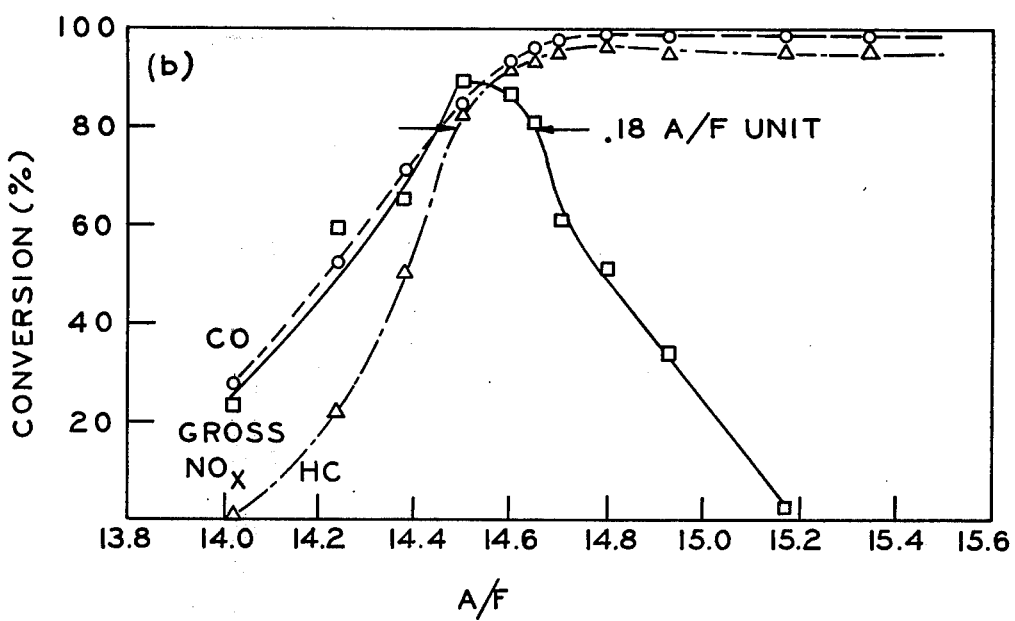
FIG. 2 is a graphical presentation similar to FIG. 1 of tests carried out on the same three-way catalysts but having the engine operated in accordance with the teachings of the method of this invention.

Reference is made to FIG. 2 which shows conditions in which the air-fuel control system associated with the engine was programmed to produce a signal which cycled back and forth at a rate of 1 cycle per second (1 Hz) in a sawtooth pattern of ±0.6 air-fuel units on each side of stoichiometric. When this perturbation was applied, a window of 0.18 air-fuel units was achieved over which the three-way catalysts could operate and still achieve at least an 80% elimination of HC, CO and $NO_x$. By a sawtooth pattern it is meant that the air-fuel ratio goes from stoichiometric to the lean condition and from the lean condition back to stoichiometric as a straight line function and thereafter crosses the stoichiometric condition and proceeds to and returns from the rich condition thereof in a straight line function.

Other types of perturbation configurations which may be used are square wave patterns and sine wave patterns. The only thing that is critical is that the total area under curve on each of the sides of stoichiometric be the same so that the overall addition of these two conditions would result in a stoichiometric condition.

Figure 3:
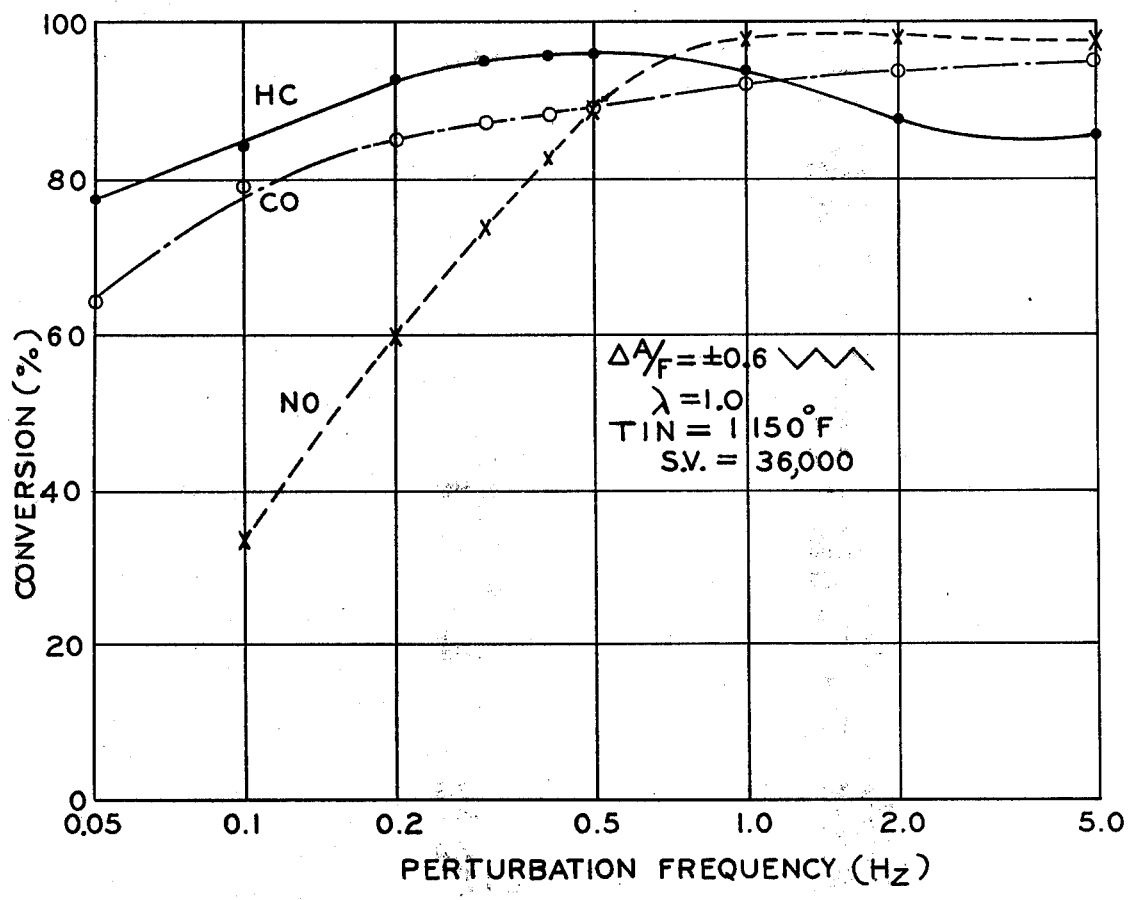
FIG. 3 is another graphical presentation which shows conversion percentages against the frequency of variation of the air-fuel ratio.

Reference is now made to FIG. 3 which is a graphical presentation showing the percent conversion of HC, CO and $NO_x$ as a function of the frequency of the perturbation applied to air-fuel ratio. In essence, this graphical presentation shows that better than 80% conversion is obtained only when the perturbation frequency is greater than 0.4 cycles per second. At any lower perturbation, the oxygen storage capacity of the three-way catalysts is exhausted during the lean portion of the cycle and free oxygen is available for direct oxidation of CO and HC which action results in a reduction of the $NO_x$ conversion. The slowness of perturbation is a function of the oxygen storage capacity of the material. If the oxygen storage capacity is increased greatly, then the perturbation frequency may be decreased. However, we generally prefer for most catalysts to work with a perturbation frequency at least about one cycle per second or more. We have found that such a frequency of perturbation is sufficiently fast that the oxygen storage capacity of most three-way catalysts is not exhausted.

In summary, the method of this invention is one which increases the window of air-fuel ratios over which three-way catalysts having an oxygen storage capacity are operative. In essence, the method involves the controlling of the air-fuel ratio of the fuel mixture being burned by the engine in a manner such that the ratio is displaced equal amounts to the rich and to the lean sides from a stoichiometric condition. The cycle of displacement to the rich and the lean sides is generally identical. Also the cycle of displacement is of a frequency that insures that the oxygen storage capacity of the three-way catalysts are not exhausted during the lean portions of the cycles. The particular cycle back and forth over the stoichiometric condition is not critical so long as the cycle is uniform on both sides of the stoichiometric condition. We have found generally that the oxygen storage capacity of most three-way catalysts is not exhausted if the frequency of perturbation is at least about one cycle per second or more. In view of the teachings of this specification, those skilled in the art will have many modifications thereof which fall within the true spirit and scope of the invention. It is intended that the claims of this application be interpreted as including such modifications within their scope.

We claim:

1. A method for widening the range of air-fuel ratios over which a three-way catalyst having an oxygen storage capacity is operative when fresh both in oxidizing at least 80% of unburned hydrocarbons and carbon monoxide, and in reducing 80% of oxides of nitrogen contained in an exhaust gas stream delivered to the three-way catalyst from an engine, which method comprises:

supplying to the engine to be burned therein an air-fuel mixture in which the fuel to air ratio is varied from a rich condition in which more fuel is present than air to burn it to a lean condition in which less fuel is present than the air to burn it, the variance of the air-fuel ratio being displaced equal amounts to the rich and to the lean sides from a stoichiometric condition with the cycle of displacement to the rich and lean sides being generally identical and of a frequency that insures that the oxygen storage capacity of the three-way catalyst is not exhausted during the lean portion of the cycle.

2. The method of claim 1 wherein: said frequency of variance is at least about one cycle per second.

3. The method of claim 1 wherein: said variance of air-fuel ratio is greater than about one unit of air-fuel ratio to the rich and to the lean sides from the stoichiometric condition.

4. A method for widening the range of air-fuel ratios over which a three-way catalyst having an oxygen storage capacity is operative when fresh both in oxidizing at least 80% of unburned hydrocarbons and carbon monoxide, and in reducing 80% of oxides of nitrogen contained in an exhaust gas stream delivered to the three-way catalyst from an engine, which method comprises:

supplying to the engine to be burned therein an air-fuel mixture in which the fuel to air ratio is varied from a rich condition in which more fuel is present than air to burn it to a lean condition in which less fuel is present than the air to burn it, the variance of the air-fuel ratio being displaced equal amounts of no more than one unit of air fuel ratio to the rich and to the lean sides from a stoichiometric condition with the cycle of displacement to the rich and lean sides being generally identical and of a frequency at least as great as one cycle per second so that the oxygen storage capacity of the three-way catalyst is not exhausted during the lean portion of the cycle.

5. The method of claim 4 wherein: said variation in air-fuel ratios takes the form of a square wave function.

6. The method of claim 4 wherein: said variation in air-fuel ratios takes the form of sawtooth function.

* * * * *